(12) United States Patent
Grafe et al.

(10) Patent No.: US 6,391,143 B1
(45) Date of Patent: May 21, 2002

(54) THERMALLY REFLECTIVE SUBSTRATE COATING AND METHOD FOR MAKING AND APPLYING SAME

(75) Inventors: Michael Grafe; Alan Grafe; Martin Sheeran, all of Woodbridge (CA)

(73) Assignee: Ontario Inc., Woodbridge (CA)

( * ) Notice: Subject to any disclaimer, the term of this patent is extended or adjusted under 35 U.S.C. 154(b) by 89 days.

(21) Appl. No.: 09/621,078

(22) Filed: Jul. 21, 2000

Related U.S. Application Data

(63) Continuation-in-part of application No. 09/228,493, filed on Jan. 11, 1999, now Pat. No. 6,120,886.

(30) Foreign Application Priority Data

Nov. 6, 1998 (CA) .............................................. 2253138

(51) Int. Cl.[7] .............................................. B32B 31/26
(52) U.S. Cl. .................. 156/278; 156/308.2; 156/331.7
(58) Field of Search ................. 156/278, 324, 156/308.2, 280, 331.7; 428/215

(56) References Cited

U.S. PATENT DOCUMENTS

| | | |
|---|---|---|
| 3,421,971 A | 1/1969 | Kamal |
| 3,421,973 A | 1/1969 | Kamal |
| 3,616,192 A | 10/1971 | Sinclair |
| 3,880,690 A | 4/1975 | Fuchs et al. |
| 4,546,045 A | 10/1985 | Elian |
| 4,786,350 A | 11/1988 | Nesbitt et al. |
| 5,478,629 A | 12/1995 | Norman |
| 5,855,976 A | 1/1999 | Oyama et al. |
| 6,120,886 A | * 9/2000 | Grafe et al. |

FOREIGN PATENT DOCUMENTS

| | | | |
|---|---|---|---|
| EP | 0 233 633 | * | 8/1987 |
| GB | 1 459 369 | | 2/1975 |
| GB | 2084 513 A | | 10/1981 |
| JP | 5-261853 | * | 10/1993 |

OTHER PUBLICATIONS

Tedlar product monograph, pp. 1 to 10, Dupont, Oct. 1995.
Dupont Material Safety Data Sheet, Tedlar PVF Film; TED 002, pp. 1 to 8, Jul. 18, 1997.
Dupont Material Safety Data Sheet, Tedlar PVF Film; TED 052, pp. 1 to 8, Nov. 27, 1997.
Dupont Material Safety Data Sheet, Tedlar PVF Film; TED 012, pp. 1 to 8, Jan. 8, 1998.
PPG Canada Inc. Material Safety Data Sheet, ENHR–GOLD, pp. 1 to 5, Feb. 25, 1998.

(List continued on next page.)

*Primary Examiner*—Curtis Mayes
(74) *Attorney, Agent, or Firm*—Riches, McKenzie & Herbert LLP

(57) ABSTRACT

A film wrap coating used to coat both metallic and non-metallic profiles for architectural and/or automotive components including a PVC backing layer which is bonded and at least partially cross-linked to a polyvinyl fluoride (PVF) film layer, and a paint or pigment layer applied to the PVF layer, most preferably, the paint applied to thermally reflective latex paint. The film wrap is formed by aligning a sheet of PVF overtop of a flexible sheet of PVC. Following the alignment of the PVC and PVF sheets, a third layer of paint is then applied to the exposed surface of the PVF sheet and the three layers are heated so that the PVC and PVF sheets fuse to each other resulting in at least partial cross-linking therebetween, and the paint on the pigment layer cures and fuses to the PVF sheet.

17 Claims, 5 Drawing Sheets

OTHER PUBLICATIONS

PPG Canada Inc. Material Safety Data Sheet, ENHR–WHITE, pp. 1 to 5, Feb. 25, 1998.

PPG Canada Inc. Material Safety Data Sheet, ENHR–RED, pp. 1 to 5, Feb. 25, 1998.

PPG Canada Inc. Material Safety Data Sheet, ENHR–GREEN, pp. 1 to 5, Feb. 25, 1998.

PPG Canada Inc. Material Safety Data Sheet, ENHR–BLACK, pp. 1 to 5, Feb. 25, 1998.

PPG Canada Inc. Material Safety Data Sheet, ENHR–YELLOW, pp. 1 to 5, Feb. 25, 1998.

PPG Canada Inc. Material Safety Data Sheet, ENHR–BLUE, pp. 1 to 5, Feb. 25, 1998.

* cited by examiner

HEAT ABSORPTION CHART INDICATING PROFILE TEMP. ELEVATION

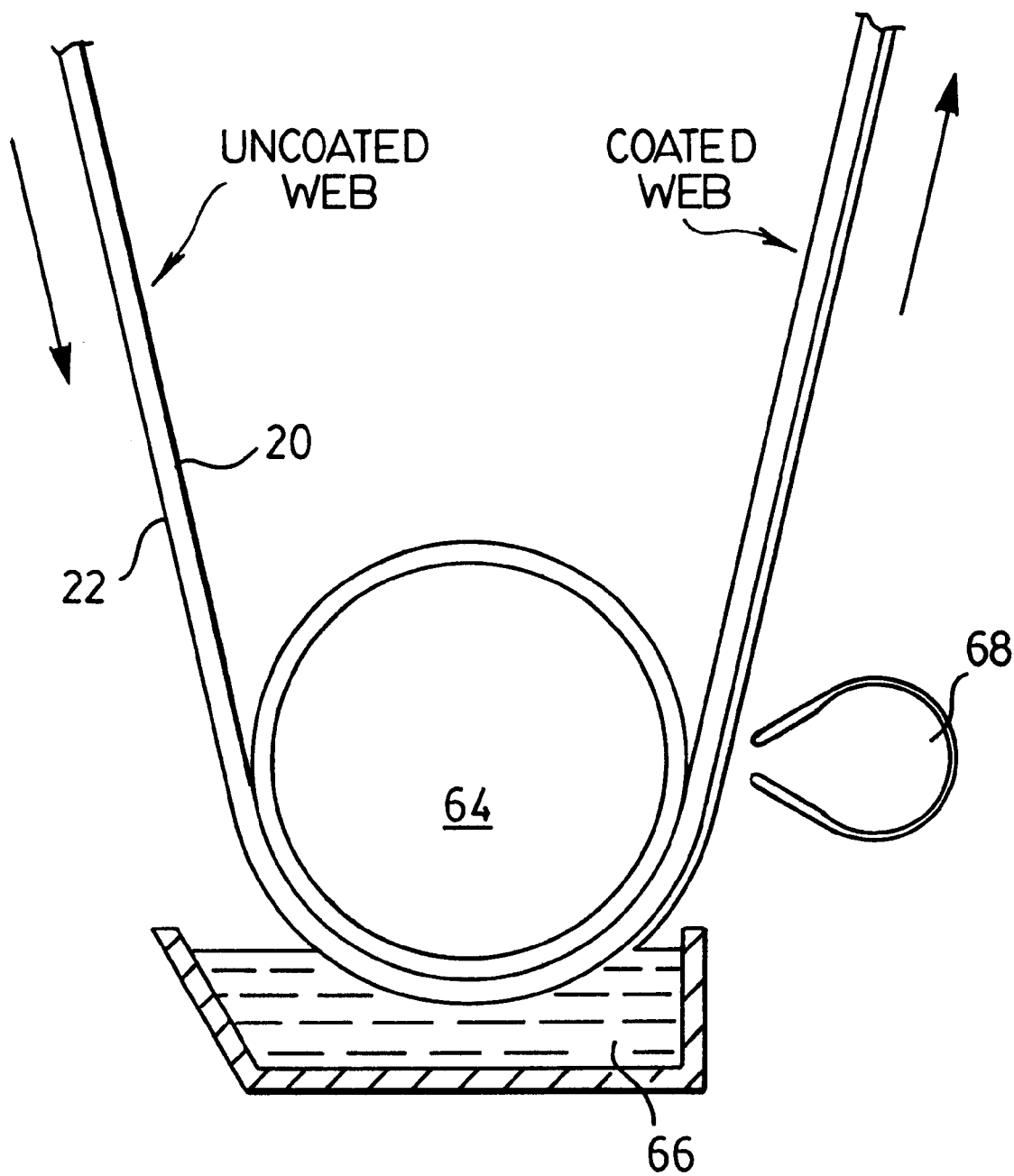

THERMALLY REFLECTIVE SUBSTRATE COATING AND METHOD FOR MAKING AND APPLYING SAME

RELATED APPLICATIONS

This application is a continuation-in-part of U.S. patent application Ser. No. 09/228,493, filed Jan. 11, 1999, and entitled "Thermally Reflective Substrate Wrap" now U.S. Pat. No. 6,120,886.

SCOPE OF THE INVENTION

The present invention relates to a thermally reflective substrate coating and a method for making and applying such a coating, and more particularly a wrap coating which may be applied to profiles such as those used to form architectural or automotive components and which has improved scratch and distortion resistance.

BACKGROUND OF THE INVENTION

Various spray coatings have been proposed for use in reducing the temperature rise associated with sun light exposure on metallic and non-metallic substrates. One such coating is disclosed in U.S. Pat. No. 4,546,045 to Elias, which issued Oct. 8, 1985, and involves the application of a paint composition comprised of a film forming polymer and an infrared reflective pigment to polyvinyl chloride (PVC) substrate profile. Following the application of the coating composition, the substrate profile is baked at 130° F. for approximately twenty minutes to ensure proper coating adhesion to the substrate profile.

A difficulty with conventional coating techniques exists in that depending upon the substrate or profile to be coated, it may not be economically or physically possible to bake the painted PVC profile to provide the required curing for proper adhesion of the thermally reflective paint. In particular, often it is desirable to provide coatings to PVC profiles which are used in the formation of architectural components such as pilasters, windows and doors. Such profiles are manufactured off site and are coated as elongated PVC or other plastic extrusions prior to final door or window assembly. Similarly, it is envisioned that various plastic profiles used in the automotive industry to form bumpers, fenders and other auto parts may be too large or cumbersome to heat cure and achieve the necessary adhesion of the thermally reflective paint.

SUMMARY OF THE INVENTION

Accordingly, it is an object of the present invention to overcome at least some of the disadvantages of the prior art by providing a thermally reflective wrap coating which may be applied as a coating to a number of different profiles made from wood, metal, or American Architectural Manufacturer's Association (AAMA) #303 certified plastics including polyvinyl chloride (PVC), sheet molding compound (SMC), acrylonitrile-butadiene-styrene resins (ABS), polyphenylene oxide (PPO), nylon, polystyrene, fibreglass and any other non-metallic or synthetic substrates including those suitable for use as architectural and/or automotive components.

Another object of the invention is to provide a coloured wrap coating for substrate profiles which includes a thermally reflective paint or pigment layer, and which may be secured to an exposed surface of the profile by conventional processes, including cold and/or hot gluing, sonic welding, hot welding, and the like.

Another object of the invention is to provide a wrap coating for non-metallic materials made from AAMA plastics which provides material with increased thermal reflectivity and ultra-violet (UV) protection, to prolong the product life.

Another object of the invention is to provide architectural or automotive components with factory-applied organic coatings, which will provide and maintain a superior level of performance in terms of film integrity, exterior weatherability and general appearance over a period of many years.

The invention resides in an improved flexible film wrap which may be used to coat both metallic and non-metallic profiles, including wood and plastics, and which preferably include profiles used as architectural and/or automotive components. The film wrap includes a PVC backing layer or sheet which is bonded and at least partially cross-linked to a polyvinyl fluoride (PVF) film layer, and a paint or pigment layer applied to the PVF layer. Most preferably, the pigment layer is thermally reflective paint, as for example is disclosed in U.S. Pat. No. 4,546,045 to Elias.

To form the film wrap, a first surface of a flexible 0.5 to 3 mil thick sheet of PVF is aligned overtop of a flexible 1 to 7 mil thick sheet of PVC. Following the alignment of the PVC and PVF sheets, a third layer of the thermally reflective paint is then applied to the second other exposed surface of the PVF sheet and the three layers are heated. Most preferably, heating occurs at between approximately 275° and 375° F. for approximately 1 to 10 minutes until such time as the PVC and PVF sheets fuse to each other, resulting in at least partial cross-linking therebetween, and the paint or the pigment layer cures and fuses to the PVF sheet.

The paint layer may be: applied to the PVF sheet in a number of different manners, as for example, by spraying, brush coating or roll coating. Most preferably, the paint layer is applied as a layer having a wet thickness of about 0.5 to 3 mil, and dries to a thickness of 0.5 to 1.2 mil, and more preferably 0.8 to 1 mil.

It has been found that the wrap coating may be secured as a covering layer to a number of different profiles. Most advantageous, however, it has been found that the PVC backing of the wrap coating may be secured to an exposed surface of a non-metallic profile, including those made from PVC, SMC, ABS, PPO, nylon, polystyrene and fiberglass, which are used to form either architectural components such as pilasters, window and door frames, or automotive components such as bumpers, dash boards, consoles and the like. The wrap coating may be secured to the profiles in a number of conventional manners, including by cold gluing, heat welding or fusing and sonic welding. The applicant has appreciated, however, one preferred method whereby a polyurethane reactive hot-melt glue is used to secure the PVC backing layer of the coating directly to the profile.

Accordingly, in one aspect the present invention resides in a thermally reflective flexible wrap for use in coating articles, comprising a polyvinyl chloride backing layer, a polyvinyl fluoride layer at least partially crossed linked to the backing layer, and a pigment coating layer applied to the polyvinyl fluoride layer, said pigment coating layer having a thickness selected at between 0.5 and 2 mils.

In another aspect, the present invention resides in a method of manufacturing a flexible thermally reflective coating wrap comprising a polyvinyl chloride backing sheet, a polyvinyl fluoride sheet at least partially, crossed linked to the backing layer, and a pigment coating layer applied to the polyvinyl fluoride layer having a thickness selected at between 0.5 and 2 mils, said coating wrap being formed by the steps of, positioning a first surface said polyvinyl fluoride sheet in overlying juxtaposition with a first surface said polyvinyl chloride sheet;

applying said pigment to a second other surface of said polyvinyl fluoride sheet; and heating said polyvinyl chloride sheet, said polyvinyl fluoride sheet and said pigment at a temperature selected at between about 250 and 400° F. to substantially cure said pigment and at least partially cross link polyvinyl fluoride sheet and said polyvinyl chloride sheet to each other.

In a further aspect, the present invention resides in a process for coating a substrate with a thermally reflective film coating, said film coating comprising a polyvinyl chloride backing layer, a polyvinyl fluoride layer at least partially crossed linked to the backing layer, and a pigment coating layer applied to the polyvinyl fluoride layer having a dry thickness selected at between 0.5 and 2 mils, said substrate being coated by the steps of applying a hot melt glue in a melted state to an exposed surface of said substrate; while said hot melt glue remains in said melted state positioning said film coating on said exposed surface.

In a further aspect, the present invention resides in a coated component comprising a non-metallic substrate selected from an architectural component and an automotive part component, and a thermally reflective wrap secured to at least one exposed surface of said non-metallic substrate, said wrap comprising a polyvinyl chloride backing layer, a polyvinyl fluoride layer at least partially crossed linked to the backing layer, and a pigment coating layer applied to the polyvinyl fluoride layer, said pigment coating layer having a thickness selected at between 0.5 and 2 mils.

BRIEF DESCRIPTION OF THE DRAWINGS

Further objects and advantages of the invention will appear from the following description taken together with the accompanying drawings in which:

FIG. 6 shows schematically an apparatus used in the application of thermally reflective paint to form the wrap film.

DETAILED DESCRIPTION OF THE DRAWINGS

Figure 1:
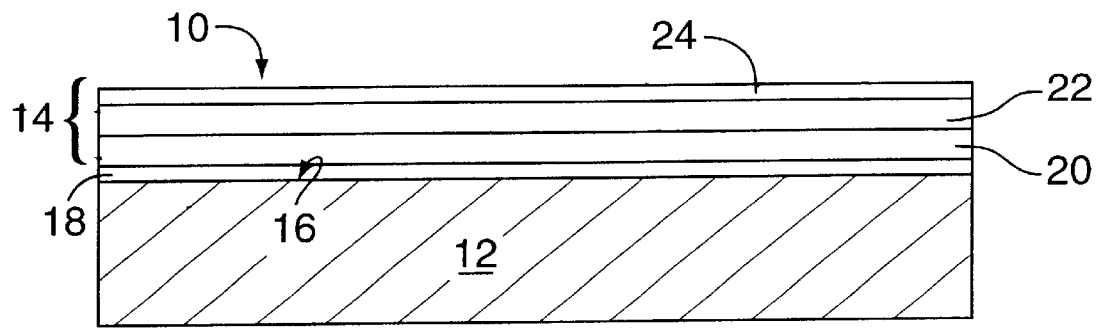
FIG. 1 shows a schematic cross-sectional enlarged view of a wrap coated window sill profile in accordance with a preferred embodiment of the invention.

Reference is now made to FIG. 1 which shows a coated window sash component 10 in accordance with the preferred embodiment of the invention. The window sash component consists of a polyvinyl chloride (PVC) sash profile or substrate 12 which has a flexible three layer wrap coating 14 secured to its outer exposed surface 16 by a layer of hot melt glue 18.

The wrap coating 14 consists of an inner PVC backing layer 20, a polyvinyl fluoride (PVF) intermediate layer 22 and an outer paint layer 24. The PVC backing layer is formed from a flexible PVC sheet having a thickness of approximately 2 to 6 mils and more preferably 3 to 5 mils. As will be described, the backing layer 20 is cross-linked to the PVF intermediate layer 22 through partial heat melting. The PVF layer 22 may for example be of a flexible film type sheet such as TEDLAR™ films sold; by DuPont to provide enhanced UV blocking properties to the window sash component 10. The PVF layer 22 has a thickness of between about 0.7 and 2 mils, and more preferably 0.87 and 1.5 mil. For example, preferred PVF films would have compositional ranges as shown in Table 1.

TABLE 1

| Components Material | % by weight |
| --- | --- |
| Polyvinyl Fluoride Polymer | 64–86 |
| Titanium Dioxide | 2–30 |
| Calcium Carbonate | 0–15 |
| Amorphous Silica | 0–5 |
| Iron Oxide | 0–5 |
| Other Nonregulated Colorants (optional) | 0–1 |
| Dimethyl Acetamide (DMAC) | <1 |
| Hydrogen Fluoride | <1 |
| Nickel Antimony Titanium Yellow Pigment (optional) | 0.04–25 |
| Carbon Black (optional) | <1 |

Decomposition temperature 204° C.

The outer paint layer 24 provides the wrap coating 14 with the desired finished color. Most preferably, the paint layer 24 is water based to provide for reduced toxicity and may further be an infrared reflective paint such as those sold by PPG Canada Inc. under the product trade name Environ HR™. The paint layer 24 has a dry thickness selected at about between 0.06 and 1.4 mils, and more preferably 0.08 and 1.1 mil. It has been found that improved thermally reflective properties may be achieved where the paint layer 24 is maintained at the preferred dry thickness. More particularly, if the paint layer 24 is too thick, the layer 24 will act as a heat sink, diminishing the thermally reflective properties of the coating 18.

Figure 5:
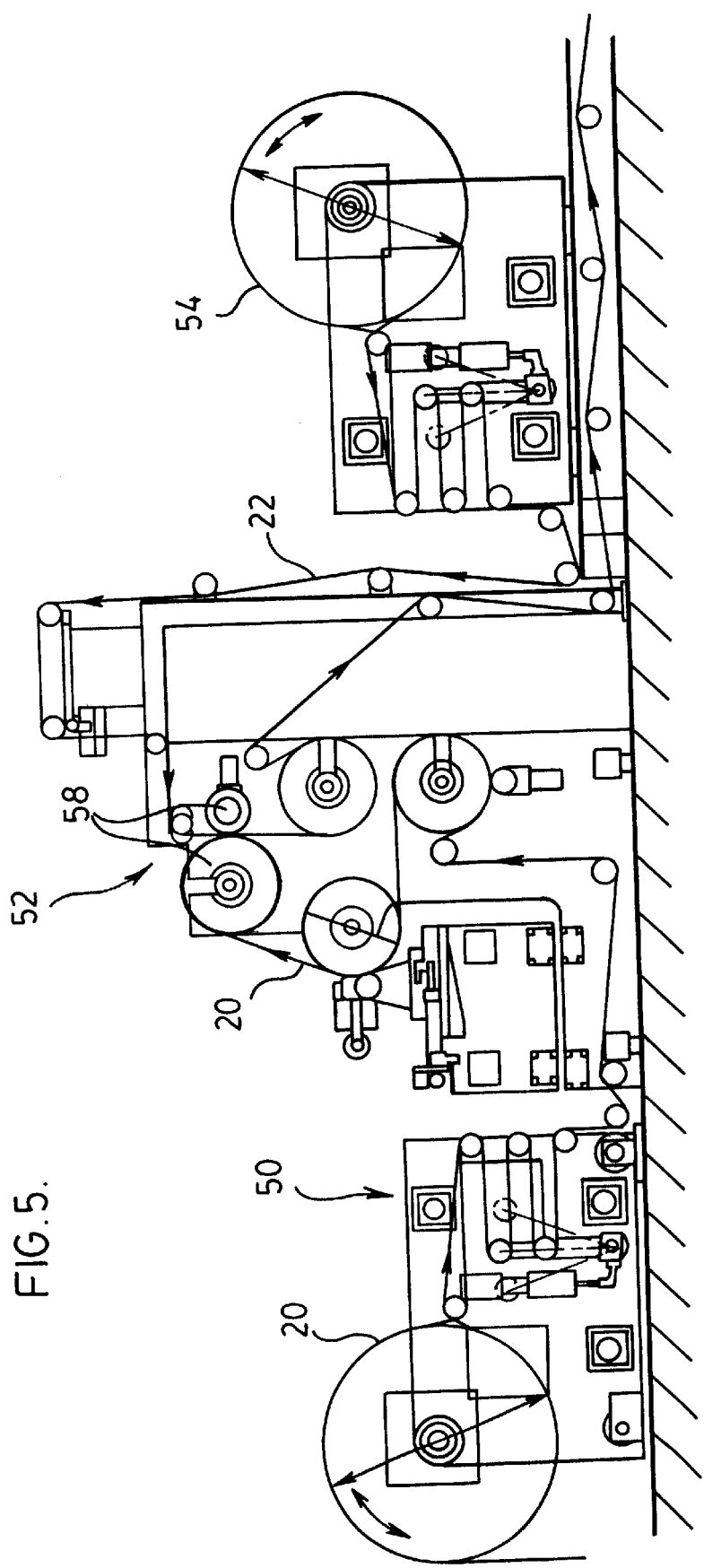
FIG. 5 illustrates schematically a preferred apparatus for manufacturing laminated PVC and PVC layers used in the wrap coating of the present invention.

As shown best in FIG. 5, the coating wrap layer 14 is formed by placing a first surface of the PVF sheet 22 flat against a first surface of the PVC backing sheet 20. Most preferably, the base or backing sheet 20 is in an initially semi-rigid form and is fed from an unwinder 50 through a PUR (polyurethane) coating head 52 where a polyurethane adhesive is applied. Downstream from the coating head 52, the PVF sheet 22 such as Dupont Tedlar™, is supplied from a second unwinder 54. The PVF sheet 24 is corona treated and laminated to the sheet 20 by pressure rollers 58. After laminating, the fused sheets 20,22 are rewound, ready for paint coating.

FIG. 6 shows best the apparatus 60 used in the application of the paint layer 24 to the laminated sheets 22,20. The laminated sheets 22,20 are unwound from a supply spool (not shown) and moved via a coating roll 64 into a liquid paint trough 66. The laminated sheets 22,20 are moved through the trough 66 so that the infrared reflecting paint 24 is applied to the exposed surface of the PVF sheet 22. Once coated, the paint layer 24 is preferably immediately moved past an air knife coater 68, such as those sold by Magnal Machinery Inc. of Florence, Ma., U.S.A. The air knife coater 68 provides a substantially uniform angled air jet force across the coated surface to ensure a uniform paint layer thickness. Other methods of paint application including brushing, spraying and other rolling applications are, however, also possible. To achieve the desired dry layer thickness, paint layer 24 is most provided applied in a wet thickness selected at between approximately 0.5 and 3 mil, preferably 1.8 and 2.6 mil, and more preferably about 2.2 mil.

Following the application of the paint layer 24 to the PVF layer 22, the three layers are heated to a temperature of between about 275 and 375° F. by catalytic infrared exposure, and more preferably about 325 to 330° F. for a period of between 1 and 5 minutes, until complete curing and bonding of the paint, layer 24 to the PVF layer 22 has occurred, and the PVF layer 22 bonds and achieves cross linking with the PVC backing layer 20. During curing, the wrap coating 14 may optionally be cast onto a Teflon™ coated belt for final cooling.

Once cooled, the wrap coating 14 has been found to be quite stretchable and flexible with the paint layer 24 providing the desired pigment colour. In addition, the application of the paint layer 24 in a dry thickness of at least about 0.8 mil results in the wrap coating 14 being visibly free from flow lines, streaks, blisters or other surface imperfections in the dry-film state on exposed surfaces when observe d at a distance of 10 feet (305 cm) from the coated surface and inspected at an angle of 90 degrees to the surface.

While it is possible to Wrap almost any profile or substrate with the film, including those made from wood or metals, such as steel, the wrap coating 14 is most preferably used with AAMA (#303 ) certified plastics including those such as PVC, SMC, ABS, PPO, nylon, polystyrene and fibreglass.

Figure 2:
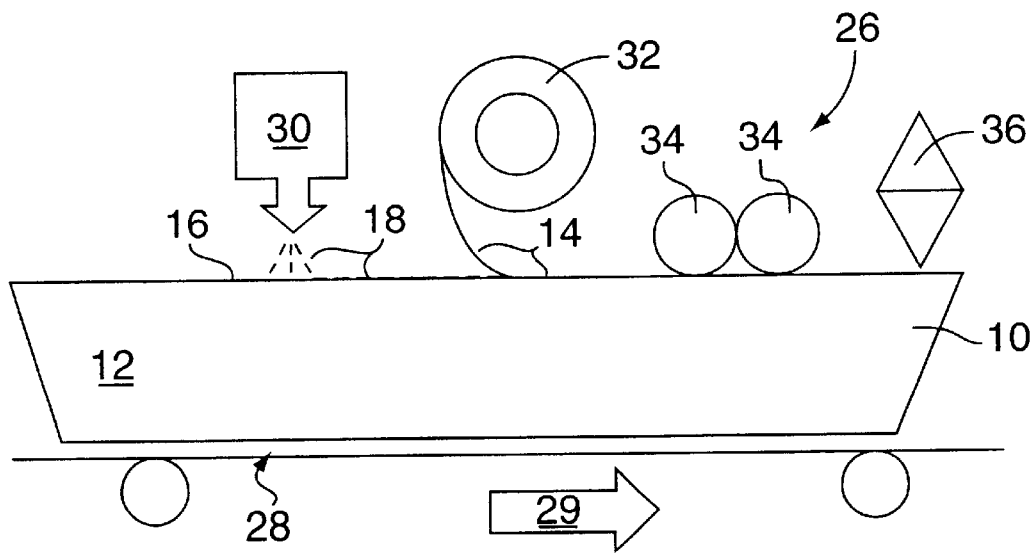
FIG. 2 shows schematically a production assembly line used in the wrap coating of the window sill profile shown in FIG. 1.

FIG. 2 shows a preferred apparatus 26 used in wrapping the PVC window sash profile 12 shown in FIG. 1. In use of the apparatus 26, the window sash profile 12 would be delivered uncut, as an elongated profile 5 to 20 meters in length. The uncoated profile 12 is moved via a conveyor line 28 in the direction of arrow 29. Initially the profile 12 moves on the conveyor 28 under a glue work station 30 where the polyurethane reactive hot melt glue layer 18 is first applied to the surface 16 of the profile 12. Immediately following the application of hot melt glue 18 and while the glue 18 remains in an uncured, melted state, the wrap coating 14 is unrolled from a storage spool 32 and positioned as a flat sheet on the surface 16. Following the application of the wrap coating 14 on the exposed surface 16, the profile 12 is moved through a series of pressure rollers 34 which are used to press and properly position the wrap coating 14 on the surface 16, and eliminate any air bubbles therebetween. As the hot melt glue layer 18 cools, the window sash profile 12 is then moved through a shearing station 36 where any excess wrap 14 is trimmed and removed. Following the completion of the coating process, the sash component 10 may be cut into desired lengths for final assembly into a window frame (not shown).

Figure 3:
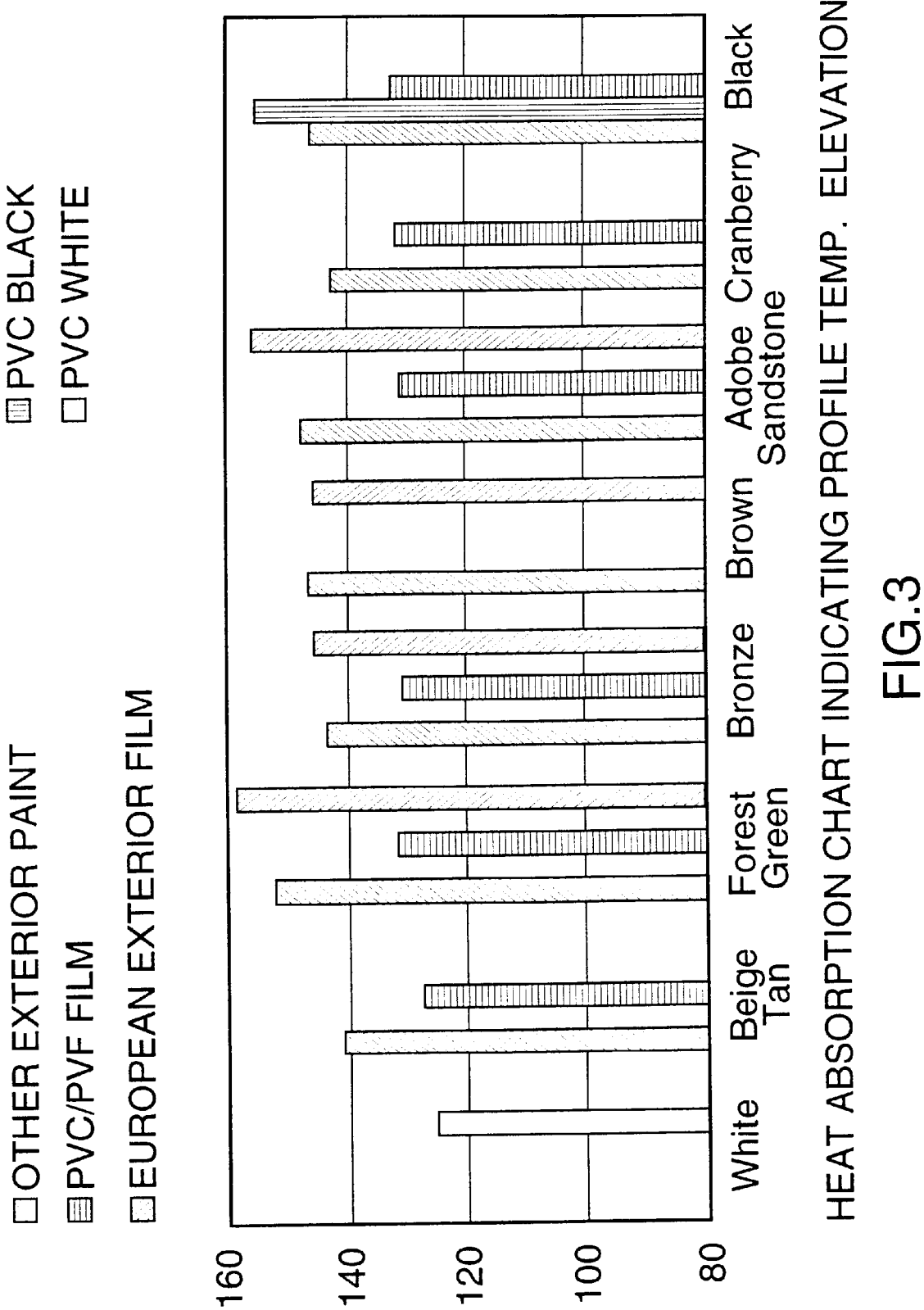
FIG. 3 shows graphically the heat absorption for films of various coloured PVC laminates and extrusions.
Figure 4:
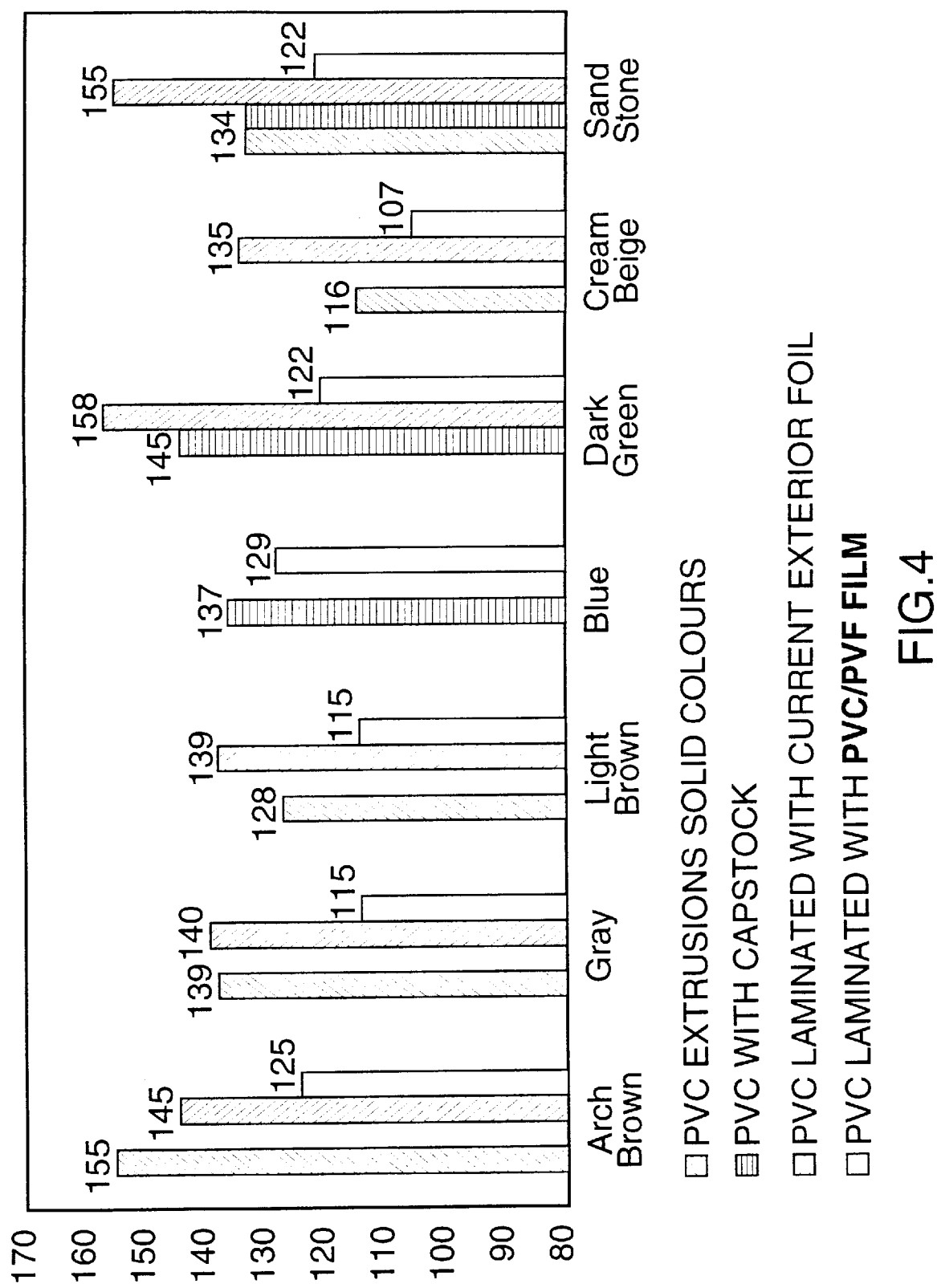
FIG. 4 shows graphically the thermal reflective properties of coated and uncoated polyvinyl chloride extrusions.

FIG. 3 graphically illustrates the heat absorption properties of various coloured paints, concentrated European films, a s well as those of black and white coloured polyvinyl chloride, as compared to the PVC/PVF film of the present invention. FIG. 4 similarly represents the properties of thermal reflectivity for PVC extrusions having either solid colours, those laminated with conventional exterior foils, and those when covered with a PVC/PVF wrap coating in accordance with the present invention. As is apparent, the PVC/PVF film of the present invention advantageously provides the wrapped substrate with thermally reflective properties which approach that of white PVC.

Although the preferred embodiment describes the use of a hot melt glue layer 18 to secure the wrap coating 14 to the exposed surface 16, other means of securing the coating 14 to the profile 12 may also be used. For example, if desired, the coating 14 could be secured in place by heat or sonically fusing the PVC backing layer 20 directly to the PVC profile 12. Alternately, cold adhesives or, separate fusible layers could be inserted between the coating 14 and profile 12 to bond the wrap coating 14 in place.

While the detailed description describes the application of the wrap coating 14 to a PVC window sash profile 12, the invention is not so limited. If desired, the coating 14 could be used as a coating for profiles made for various other purposes including other architectural components, automotive parts such as bumpers, consoles and dash boards, or with almost any other substrates which are currently wrapped with vinyl.

Although the detailed description describes various preferred embodiments of the invention, the invention is not so limited. Many modifications and variations will now occur to persons skilled in the art. For a definition of the invention reference may be had to the appended claims.

We claim:

1. A method of manufacturing a flexible thermally reflective coating wrap comprising a polyvinyl chloride backing sheet, a polyvinyl fluoride sheet at least partially crossed linked to the backing sheet, and a pigment coating layer applied to the polyvinyl fluoride sheet, said coating wrap being formed by the steps of, securing a first surface said polyvinyl fluoride sheet substantially in overlying juxtaposition with a first surface said polyvinyl chloride sheet;

applying said pigment coating to a second other surface of said polyvinyl fluoride sheet; and heating said polyvinyl chloride sheet, said polyvinyl fluoride sheet and said pigment coating at a temperature selected at between about 250 and 400° F. to substantially cure said pigment coating and at least partially cross link polyvinyl fluoride sheet and said polyvinyl chloride sheet to each other.

2. The method of claim 1 wherein said polyvinyl fluoride sheet is secured to said polyvinyl chloride sheet by pressure rolling said sheets together.

3. The method of claim 1 wherein said pigment coating comprises an infrared reflective paint.

4. The method of claim 1 wherein said pigment layer is applied by moving said polyvinyl fluoride layer through a reservoir liquid pigment, and thereafter passing said coated wrap through an air knife apparatus prior to said pigment curing.

5. The method as claimed in claim 4 wherein said heating step is performed at a temperature of between about 325° and 330° F. for a period of between about 1 and 5 minutes.

6. The method of claim 1 wherein said polyvinyl chloride sheet has a thickness selected at between about 1 and 7 mil, said polyvinyl fluoride sheet has a thickness selected at between about 0.5 and 3 mil, and said pigment coating comprises an infrared reflective paint, wherein said pigment coating is applied to said second surface in a wet thickness of between about 0.5 and 3 mils.

7. A process for coating a substrate with a flexible thermally reflective film coating, said film coating comprising a polyvinyl chloride backing layer, a polyvinyl fluoride layer at least partially crossed linked to the backing layer, and a pigment coating layer applied to the polyvinyl fluoride layer having a dry thickness selected at between 0.5 and 2 mils, said substrate being coated by the steps of, applying an adhesive to an exposed surface of said substrate; and while said adhesive remains in an uncured state, positioning said film coating on said exposed surface.

8. The process as claimed in claim 7 wherein said substrate is made of a non-metallic material selected from the group consisting of polyvinyl chloride, sheet molding compound, acrylonitrile-butadiene-styrene resin, polyphenylene oxide, nylon, polystyrene and fiberglass.

9. The process as claimed in claim 8 wherein said polyvinyl chloride backing layer has a thickness selected between about 3 and 5 mil, said polyvinyl fluoride layer has a thickness selected between about 0.87 and 1.5 mil, and said pigment coating layer has a dry thickness selected between about 0.8 and 1.1 mil.

10. The process as claimed in claim 9 wherein said substrate is selected from the group consisting of a pilaster, a window frame component, a door frame component, a vehicle bumper, a vehicle dash board and a vehicle console.

11. The process of claim 9 wherein said pigment comprises an infrared reflective paint.

12. The process as claimed in claim 8 wherein said adhesive comprises a polyurethane reactive hot-melt glue.

13. The process as claimed in claim 12 wherein said substrate is selected from the group consisting of a pilaster, a window frame component, and a door frame component.

14. The process of claim 13 wherein said pigment comprises an infrared reflective paint.

15. The process as claimed in claim 12 wherein said substrate is selected from the group consisting of a vehicle bumper, a vehicle dash board and a vehicle console.

16. The process of claim 15 wherein said pigment comprises an infrared reflective paint.

17. The process as claimed in claim 7 wherein said substrate is selected from the group consisting of a pilaster, a window frame component, a door frame component, a vehicle bumper, a vehicle dash board and a vehicle console.

* * * * *